Jan. 3, 1956 M. D. BREITENBACH 2,729,196
PORTABLE RACK
Filed Sept. 23, 1952 3 Sheets-Sheet 1

INVENTOR.
MALOY D. BREITENBACH
BY
John H. Widdowson
ATTORNEY

Jan. 3, 1956  M. D. BREITENBACH  2,729,196
PORTABLE RACK

Filed Sept. 23, 1952  3 Sheets-Sheet 2

INVENTOR.
MALOY D. BREITENBACH
BY
John H. Widdowson
ATTORNEY

United States Patent Office 2,729,196
Patented Jan. 3, 1956

2,729,196
PORTABLE RACK
Maloy D. Breitenbach, Belpre, Kans.

Application September 23, 1952, Serial No. 311,097

8 Claims. (Cl. 119—20)

This invention relates to rack means. In a more specific aspect, it relates to an adjustable and expansible all purpose rack mounted on wheels, which is particularly useful on a farm and/or ranch.

I have invented a portable rack which has a great many uses. With the portable rack of my invention one man can handle livestock, performing all the operations attendant to the raising, feeding and handling of same. The rack of my invention is mounted on wheels. It has two side sections having horizontally disposed side members which side members are connected together by expansible members, so that the height of the side sections can be adjusted, as desired. The rack of my invention has end sections having horizontally disposed, expansible end members, so that the rack can be adjusted to a desired width. The end members are connected by expansible members, so that the height of the end sections is adjustable. The side and end sections are connected together to form the four sided rack of my invention.

The portable rack of my invention has many uses on a farm and/or ranch, particularly with regard to handling livestock. It can be used as a corral, a cutting pen, a walking pen, a spraying and/or vaccinating pen, a creep feeding pen, a dehorning chute or squeeze and pen, a loading chute, a driving wing, a windbreak, etc. With the portable rack of my invention, one man can pen, cut, dehorn, vaccinate, feed, show, move, spray, load, etc., livestock in any location. The portable rack of my invention can also be used as a trailer to transport articles, such as boats, pipe, lumber, machinery, etc. It can be used as a framework for storing materials, etc. I have found that the rack of my invention can be particularly advantageously used to self-feed cattle. Over 100 head of cattle have been self-fed using the rack of my invention for over two weeks with one filling of the rack with feed.

It is an object of my invention to provide new portable rack means.

It is another object of my invention to provide a new portable rack which can be particularly advantageously used to handle livestock on a farm and/or ranch.

It is still another object of my invention to provide a new portable rack which can be advantageously used as a trailer.

Other objects and advantages of the portable rack means of my invention will become apparent to one skilled in the art upon reading this disclosure.

In the drawings which accompany and are a part of this disclosure,

Figure 1:
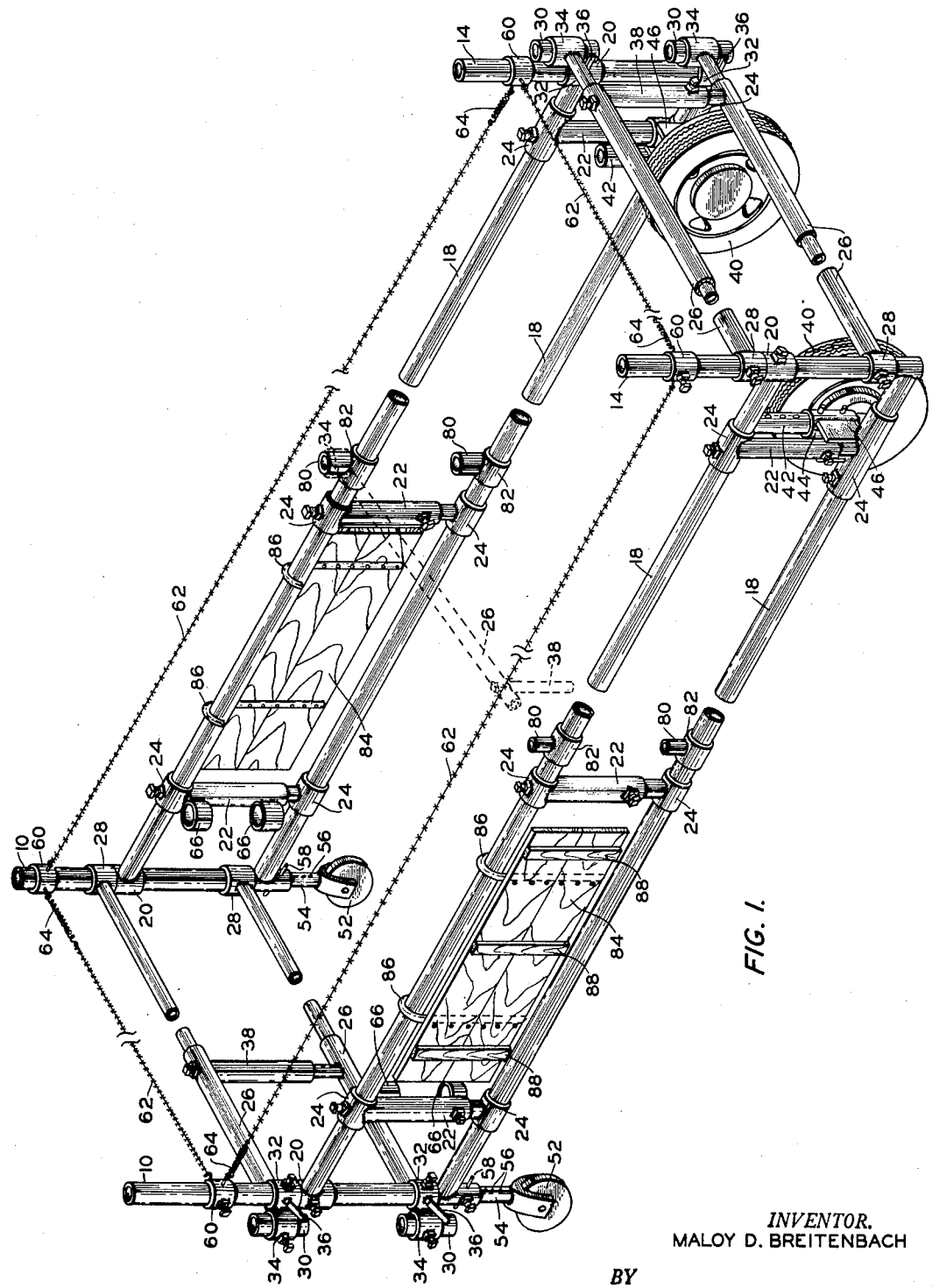
Fig. 1 is a perspective view of a preferred specific embodiment of the portable rack of my invention, showing parts broken away.

To further describe the portable rack means of my invention reference is now made to the drawings, whereon the same reference numerals are used to indicate like or similar structure and/or parts. The drawings depict preferred specific embodiments of the rack of my invention, and it is to be understood that such drawings and the following description are not to unduly limit the scope of my invention.

Referring now to the drawings, my rack has front corner members 10 and rear corner members 14, which can conveniently be sections of pipe, drilled rod, or bars, and the like. It is preferred that corner members 10 be tubular so that other members can easily be telescopically mounted in the ends thereof.

The rack has two side sections each of which has two side members 18, which are preferably tubular and can conveniently be sections of pipe. The upper side members 18 are attached to the corner posts 10 and 14, preferably removably, adjustably and slidably connected through suitable means such as collar means 20, held in the desired place on the corner posts by set screws as shown. Upper side members 18 are attached to collars 20 in any suitable manner, such as by welding, as shown. The lower side members 18 can be slidably and removably attached to corner members 10 and 14 in the manner of upper side members 18, if desired, but are preferably rigidly attached in a suitable manner, such as by welding, as shown. The side members 18 of each side section are connected by expansible members 22, which are preferably telescoping members with the outer portion of the telescoping member being the upper part, as shown. The members 22 are attached to side members 18, and preferably slidably and adjustably attached by connecting means, such as collar means 24, to which they are attached in a suitable manner, such as by welding. Set screws, as shown, are preferably used to hold members 24 in the desired place on members 18, and the telescoping members 22 can be adjusted to any desired place on members 18 by loosening the set screws, moving members 24 along members 18 to the desired location and retightening the set screws. The distance between members 18 can be varied by loosening the set screws in members 20 and 22, moving the assembly up or down to the desired position and retightening the set screws.

The rack of my invention has two end sections each of which has two expansible end members 26, which are preferably telescoping members, as shown, formed from tubular members, which can conveniently be sections of pipe. The end members are connected to corner members 10 and 14. The outer portions of the telescoping rear end member 26 and the inner portions of the front end member 26 are preferably rotatably, removably, slidably and adjustably connected to corner members 14 and 10, respectively by suitable connecting means, such as collar means 28. Connection to collar means can be in any suitable manner, such as by welding. Collars 28 are held in the desired position on members 10 and 14 by set screws, as shown. The inner portions of telescoping rear end member 26 and the outer portions of front end member 26 are connected to corner members 14 and 10, respectively, preferably through connecting means 30, which are attached in a suitable manner to collar means 32 which are preferably rotatably, slidably, adjustably and removably attached to corner posts 10 and 14. Members 30 are preferably tubular and can conveniently be short sections of pipe upon which collar members 34 are preferably removably and rotatably mounted, the ends of members 26 being attached to members 34 in any suitable manner, such as by welding. Bars, or rods, or the like, 36 are preferably used to connect collars 32 and members 30, and they can be attached in any suitable manner, such as by welding. Set screws in members 32 and 34 are preferably used to keep the collar members in the desired position. Expansible members 38, preferably telescoping members formed from tubular members, which can conveniently be sections of pipe, connect between the outer parts of telescoping members 26 preferably in the outer portions thereof. It is preferred that the outer parts of telescoping members 38 be connected to the upper member 26 and the inner parts to lower member 26. The ends of members 38 are connected in any suitable manner to members 26, such as by welding, as shown. The distance between members 26 can be varied by loosening the set screws in members 28, 32 and 38, moving members 26 to the desired position and retightening the set screws. The distance between the sides of the rack can be varied by loosening the set screws in members 26, expanding or contracting the end sections to the desired position and retightening the set screws. The inner parts of telescoping end members 26 are removably mounted in the outer parts, and when removed either of the resulting sections can be used as a gate. If desired, a removable rod or pipe (not shown) with holding means therewith can be inserted through the openings in members 30 to prevent members 34 from coming unmounted from members 30, when the inner parts of members 26 are being used as a gate, and the like.

Figure 4:
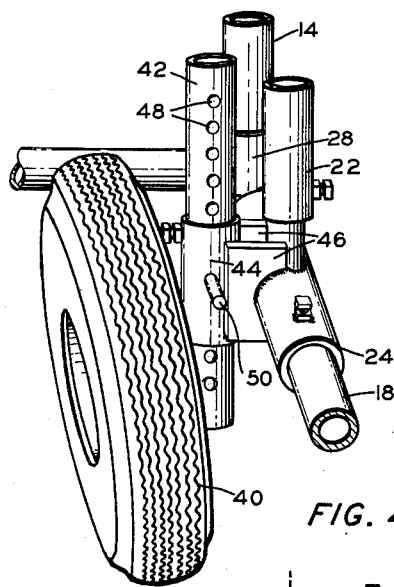
Fig. 4 is an enlarged perspective view of the rear wheel and cooperating assembly of my portable rack as shown in another perspective view in Fig. 1.
Figure 5:
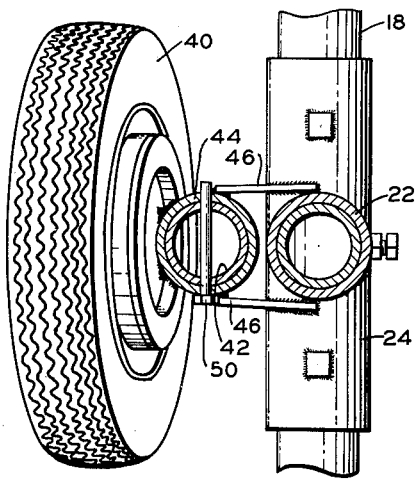
Fig. 5 is an enlarged top view of the rear wheel and cooperating assembly of my portable rack.

A wheel 40 is mounted on a member 24 on the lower member 18 of each side section, preferably the member 24 nearest corner members 14. Wheels 40 are attached to members 42. They are attached in any suitable manner, such as by welding, as shown. Member 42 in turn is removably, adjustably and rotatably mounted in member 44, which is attached to member 24 by plates 46, which are preferably welded to members 24 and 44 on both sides of members 22. The rear wheel assembly can best be seen on Figs. 4 and 5 of the drawings. Plates 46 are so positioned that the outer part of member 22 can fit between the plates, if it is desired to telescope member 22 to that extent. Member 42 preferably has spaced holes 48 therethrough which are alignable with one or more holes through member 44. A pin or bolt 50 fits in the holes in members 44 and 42 to keep members 42 in the desired position, so that the sides of the rack are at the desired height from the ground, etc. Set screws, as shown, are preferably provided to hold members 42 in the desired position in relation to member 44, if it is desired that wheels 40 be turned from a position substantially parallel to members 18. Thus, wheel 40 can be moved up or down, and it can be turned. It is desired that wheels 40 be set at an angle away from the perpendicular, as shown. I have found that this increases the shock absorbing effect of the wheels, and the range through which the wheels can be turned is increased. Members 24 are adjustable along side members 18. Therefore, the wheel assemblies can be positioned at any desired place along members 18. I have found this feature very advantageous where load adjustment is necessary or desirable.

A wheel 52 is telescopically, adjustably and rotatably mounted in corner member 10, preferably one in each of corner members 10. Members 54 which telescope into members 10 have spaced holes 56 therethrough, which are alignable with one or more holes in member 10. A pin or bolt 58 fits in the holes in members 54 in the desired position, so that the sides of the rack are at the desired height from the ground, etc. Set screws are preferably provided in members 10 to keep members 54 in the desired position, if it is desired to have the axis of wheels 52 in a position transverse members 26 instead of substantially parallel to members 26, as shown. Wheels 52 can be castering wheels, if desired.

In order to better contain large animals, such as cows, horses, etc., or relatively highly stacked bales or loose hay, and the like, it is preferred to provide wire or like means around the outside of the rack above members 18 and 26. Connecting means, such as collars 60 with eyes therewith and set screws therein, are preferably removably and adjustably mounted on the upper portions of corner posts 10 and 14. Strands of barbed wire 62 with springs 64 therein are connected between collar means 60, the springs 64 serving to keep the strands relatively tight. The strands are preferably removably connected to collars 60 by hooks fitting into the eyes on collars 60. Set screws are provided in collars 60, as shown, to hold them in the desired position on members 10 and 14, so that the strands of wire are at the desired distance from members 18 and 26.

Figure 8:
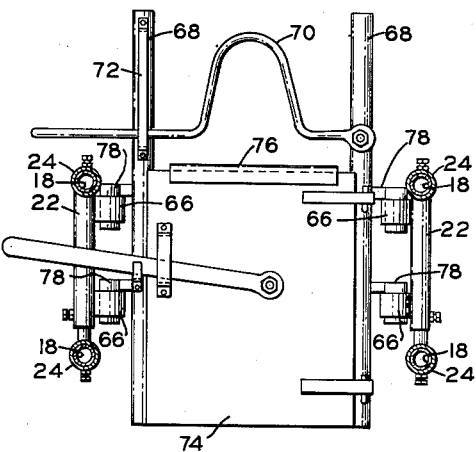
Fig. 8 is an elevation view, showing parts in section, showing a dehorning gate and the manner in which same is connected for use to the portable rack of my invention shown in Fig. 1.

Connecting and supporting members, such as eyes 66, are attached by welding or other suitable means to the outside of one of members 22, preferably members 22 nearest corner members 10. Two on the outer part of members 22, one above the other, are desirable. The eyes 66 support a dehorning gate, as shown in Fig. 8, when the rack is being used for dehorning cattle. The dehorning gate comprises two vertical members 68. A neck bar 70 is pivotally attached to one of members 68, and is movable upwardly and downwardly in a slot formed by a bar 72 attached to the other member 68, so that the neck bar can be raised to let a large calf's, yearling steer's, etc. head through and lowered over its neck to hold same. A gate 74 with a cushion 76 is hinged on one of members 68 to swing outwardly, the other side of gate 74 being latched to the other of members 68. Connecting means 78 are attached to the outside of members 68, such connecting means preferably being removably mounted on eyes 66, such as by downwardly projecting portions which hook into eyes 66, as shown.

Members 80 are preferably slidably and adjustably attached to side members 18, such as by collars 82 with set screws therein to hold them in the desired position. Members 80 removably and rotatably mount members 34 or 28 of end members 26, as shown by the dotted lines on Fig. 1, to form a gate with the end members when the rack is being used to pen and load livestock, pen and dehorn cattle, pen and cut out cattle, for instance calves from cows, and similar operations.

Figure 2:
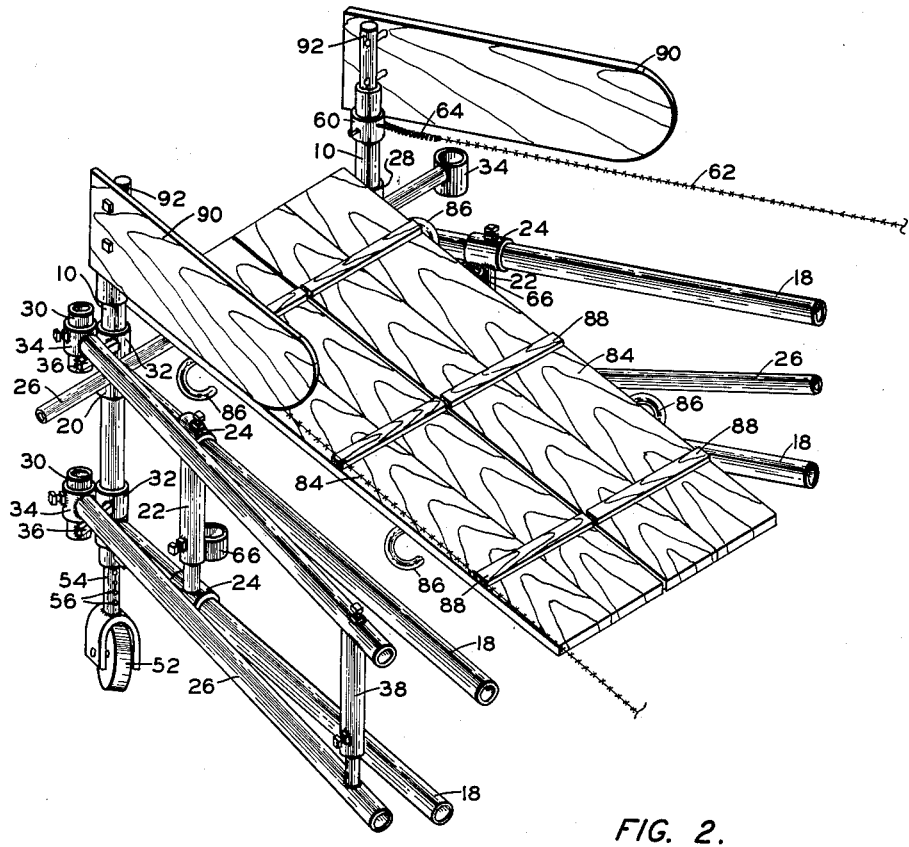
Fig. 2 is a perspective view of the front portion of the portable rack shown in Fig. 1 as set up for loading livestock into a truck, railroad car, etc.

Runway members 84 are attached in any suitable manner, such as by bolts, to members 86 which hang on side members 18. Members 84 are preferably wood planks held together by members 86 and wooden members 88 which are screwed, nailed or bolted to the planks. The runway members 84 are used as the inclined floor of the loading chute when the rack is being used as a loading chute and pen. Members 88 furnish the foothold for livestock being loaded. Fig. 2 shows the front end of the rack in assembly for use as a loading chute and pen. One of the inside parts of telescoping end members 26 resting on side members 18 is used to support members 84 to form the chute floor. The end section formed by the outer parts of telescoping end members 26 is swung back along side members 18, or, if desired, it can be used as a cutting gate, being hung on members 80 (not shown in Fig. 2) in the manner depicted by the dotted lines in Fig. 1. Wing members 90 are spaced from and attached to members 92 by bolts, as shown, or the like. Members 92 are removably and telescopically mounted in the upper portions of corner members 10. Members 90 are preferably spaced from members 92 so that the lower portions of members 90 will fit down outside of members 10 and 60, as shown. The wing members serve to keep livestock from going over the sides of the rack when being loaded into a truck, cattle car, and the like.

In Fig. 2, to better show detail of assembly, the side sections are depicted more spread out than they would be in use for loading livestock. In use, the side sections would be in close proximity to the edges of members 84 in the upper portions thereof, so that the legs of livestock would not fall through between the edges of members 84 and the sides of the rack.

Figure 3:
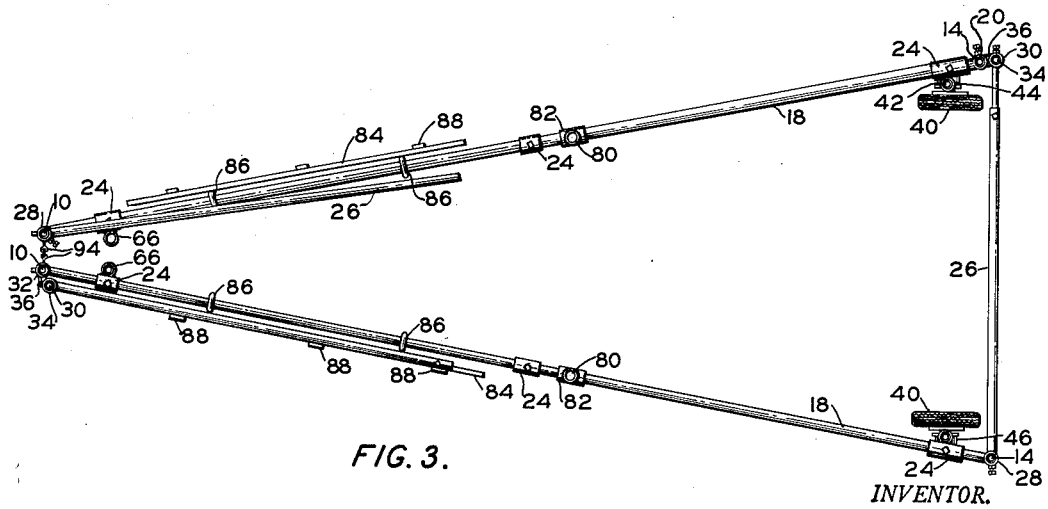
Fig. 3 is a top view on a reduced scale of my portable rack shown in Fig. 1 as set up in transport or trailing position, for pulling behind a truck, tractor, etc.

As shown in Fig. 3, eyes, or the like, members 94 can be attached to members 10, preferably to the inside thereof. Such eye members are used in holding the sides together when the rack is being trailed. Any suitable means can be used to connect such eye members, such as a member with a hook on each end to fit down through the eyes. Or the eyes can be offset one above the other, so that when the sides are together a bolt can be inserted down through the eyes to hold the sides together. Also, if desired, eye members 66 on members 22 can be used to connect to trail the rack. Members 22 can be moved forward close to corner members 10. Fig. 3 shows the rack of my invention in trailing position, for transport behind a truck, car or tractor, and the like. In this position, my rack can be used to haul boats, lumber, machinery, pipe, and many other articles.

Figure 6:
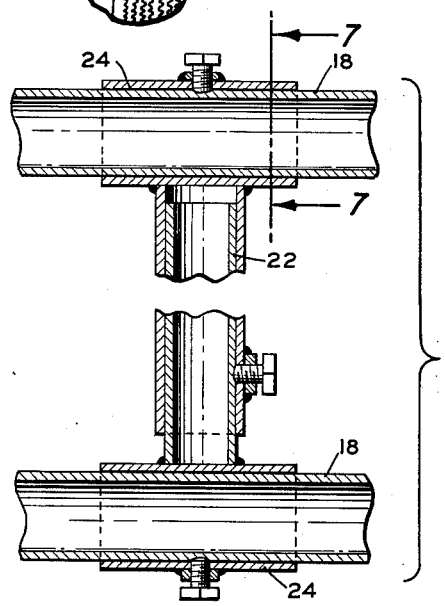
Fig. 6 is an enlarged fragmentary elevational view, with parts broken away and shown in section, of the telescoping, slidably mounted and vertically disposed members preferably used to connect the horizontal side members of the rack of my invention in the middle portion thereof, as shown in Fig. 1.

Fig. 6 shows in detail the structure of members 22 and their slidable mounting on members 18 through collars 24. Members 22 telescope and are adjustable. Set screws, as shown, are used to hold members 22 telescoped as desired, and to hold members 24 in the desired position on members 18. The structure and mounting of members 22 can be used in place of the structure and mounting shown for members 38, which are welded directly to members 26, that is, telescoping members 38 can be attached to collar means which are slidably mounted on members 26.

Figure 7:
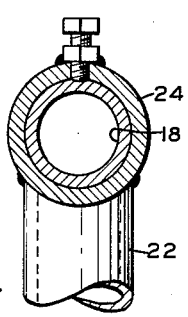
Fig. 7 is a view taken on line 7—7 of Fig. 6.

Fig. 7 is a view taken on line 7—7 of Fig. 6, showing collar means 24, which is welded to members 22, mounted on members 18. This is the desired manner of mounting for collar means used on the side, end and corner members.

The portable rack of my invention has many uses and is very versatile. As shown in Fig. 1 with end members 26 adjusted to the desired length, it can serve as a corral or a walking pen, or a pen to hold livestock for vaccination, spraying, etc., or a feeder, that is, hay can be stacked inside and livestock can reach between members 18 and 26 to eat the hay, pushing the rack with their heads and shoulders as they reduce the amount of hay. I have found that in using my rack for feeding no hay is wasted through tramping by the livestock, which is occasioned by feeding stacked hay in an open field or pasture. Members 34 can be removed from members 30, and either of the ends can be used as a gate with the set screws in members 28 loosened. A truck or hay frame can be backed into the rack for unloading hay or other feed.

The rack of my invention can be stretched out and used as a driving wing, wind break, barricade, and the like, that is, members 34 are removed from members 30 on one end of the rack, and the ends and side are placed end to end to form one long member.

Fig. 2 shows the front end in position for using the rack as a pen and loading chute. This view also shows the rack in position for hanging the dehorning gate, shown in Fig. 8, on members 66 when the rack is being used for penning and dehorning cattle. In these uses, the end section formed from members 26 and 38, shown swung back along the side in Fig. 2, can be removed from members 30 and mounted on members 80 on either side, as shown by the dotted lines in Fig. 1. This makes it possible to cut out cattle to be loaded or dehorned from a bunch of cattle penned in the rear portion of the rack, for instance, cows can be cut out from their calves.

As will be evident to those skilled in the art, various modifications of my invention can be made, or followed, in the light of this disclosure and discussion, without departing from the spirit or scope of the disclosure or from the scope of the claims.

I claim:

1. A portable four-sided rack which comprises, in combination: a pair of vertically disposed, elongated, tubular, front corner members; a pair of vertically disposed, elongated, rear corner members; two pairs of horizontally disposed, vertically spaced, elongated side members, each pair connected to one of said front and rear corner members to form opposite sides of said rack, both ends of each of said lower side members being rigidly attached to said corner members in the lower portion thereof, both ends of each of said upper side members being slidably and removably attached to said corner members; a plurality of telescoping, vertically disposed members connecting said upper and lower member of each pair of said side members, the upper end of the outer portion of each telescoping connecting member being attached to a collar slidably mounted on said upper side members, the other end of said connecting members being attached to a collar slidably mounted on said lower side members; two pairs of horizontally disposed, vertically spaced, elongated, telescoping end members, one pair connected to said front corner members and the other pair connected to said rear corner members to form opposite ends of said rack, one end of each member of each of said pair being slidably and removably mounted on one of said corner members one on either side of said upper side member attached thereto, the other end of each member of each of said pair being slidably and removably mounted on vertically disposed projecting members rigidly attached to connecting means slidably and removably mounted on the opposite corner member one on either side of said upper side member attached thereto; a telescoping, vertically disposed member connecting said upper and lower member of each pair of said end members, the upper end of the outer portion of each telescoping connecting member being rigidly attached to the outer portion of said upper one of said telescoping end members in its outer portion thereof, the other end of said connecting member being rigidly attached to the outer portion of said lower one of said telescoping end members in its outer portion thereof; two supporting wheels, each mounted on a separate vertically disposed, elongated member, each of said members telescopically, rotatably and adjustably mounted in separate connecting members, said connecting members on the inside of said rack and one of each connected to each of said collars nearest said rear corner members which are slidably mounted on said lower side members; two supporting wheels, each mounted on a separate vertically disposed, elongated member, said members telescopically, rotatably and adjustably mounted one in each of said front corner members; a pair of eyes rigidly attached on the inside one above the other to the outer portion of each of said telescoping members nearest said front corner members which are slidably attached by said collars to said upper side members; projecting members slidably and rotatably mounted, one on each of said upper and lower side members in the middle portion thereof, and each adapted to rotatably and removably mount one end of each of said end members; a connecting member slidably and removably mounted on each of said corner members in the upper portion thereof, a pair of eyes attached to each of said connecting members, a separate containing member comprising a length of wire having a spring therein vertically spaced above each of said side and end members, each end of each of said containing members attached to one of said eyes; two elongated wing members, each one of which is attached in one end portion to a single transverse member, each of said transverse members being adapted to be telescopically and rotatably mounted one in each of said front corner members in the upper portions thereof; and a rectangularly shaped runway member having a plurality of ridges on one of its sides transverse its width, said member being adapted to be hung on and carried by said upper side and end members.

2. A portable rack which comprises, in combination: four vertically disposed, elongated corner members; two side sections, each having a plurality of horizontally disposed, vertically spaced, elongated side members, each section connected in the end portions of said side members to two of said corner members to form opposite sides of said rack, and both end portions of said upper side members being slidably and removably attached to said corner members; a plurality of telescoping members connecting each of said side sections, the end portions of said telescoping members being attached to collars slidably mounted on said side members; two end sections each having a plurality of horizontally disposed, vertically spaced, elongated and telescoping end members, both end portions of said end members being slidably and removably attached to said corner members to form ends of said rack; at least one telescoping member connecting said end members of each of said end sections between the outer portions of said end members in the outer portion thereof; opposite supporting wheels mounted on shafts which are in turn mounted in collars which are attached to said collars on said side members, one wheel each on side member collars nearest said corner members in one end of said rack and said wheels being vertically adjustable and rotatable; and a supporting wheel adjustably, rotatably and telescopically mounted in one of said corner posts.

3. The apparatus of claim 2 wherein at least one eye-like supporting member is attached to the outer portion of at least one of said telescoping members of each of said side sections.

4. The apparatus of claim 3 wherein projecting supporting members are slidably attached to side members of one of said side sections, said supporting members adapted to rotatably mount one end of each of said end members.

5. The apparatus of claim 2 wherein projecting supporting members are slidably attached to side members of one of said side sections, said supporting members adapted to rotatably mount one end of each of said end members.

6. The apparatus of claim 5 wherein slidably and removably attached means is mounted on the upper portion of each of said corner members and retaining wire is connected between each of said means, said retaining wire being vertically spaced above said side and end sections.

7. The apparatus of claim 2 wherein connecting means is slidably and removably mounted on the upper portion of each of said corner members and retaining wire with a spring therein is connected between each of said connecting means, said retaining wire being vertically spaced above said side and end sections.

8. A portable rack which comprises, in combination, four corner members, two side sections, each having a plurality of horizontally disposed and vertically spaced side members with each section adjustably connected in the end portions of said side members to two of said corner members to form opposite sides of said rack and to adjustably space said side members, each of said side sections having an adjustable telescoping member connecting said side members in a middle portion thereof, two end sections, each having a plurality of horizontally disposed and vertically spaced telescoping members with each section adjustably and removably connected in the end portions of said end members to two of said corner members to form opposite ends of said rack and to adjustably space said end members, each of said end sections having an adjustable telescoping member connecting said end members in a middle portion thereof, and said rack mounted on height adjustable wheels in its end portions with one end thereof having a wheel mounted on a shaft with said shaft adjustably, rotatably and telescopically mounted in one of said corner members.

References Cited in the file of this patent

UNITED STATES PATENTS

| | | |
|---|---|---|
| 56,249 | Morley | July 10, 1866 |
| 294,106 | Baker | Feb. 26, 1884 |
| 1,293,335 | Chambliss | Feb. 4, 1919 |
| 1,608,419 | Peacock | Nov. 23, 1926 |
| 1,679,107 | Woldt | July 31, 1928 |
| 2,401,387 | Spear | June 4, 1946 |
| 2,436,647 | Huey | Feb. 24, 1948 |